US006828917B2

(12) United States Patent
Chen

(10) Patent No.: US 6,828,917 B2
(45) Date of Patent: Dec. 7, 2004

(54) ALARM SYSTEM FOR CASTING MOLD

(75) Inventor: Mu-Chu Chen, Taoyuan (TW)

(73) Assignee: The Central Mint of China (TW)

( * ) Notice: Subject to any disclaimer, the term of this patent is extended or adjusted under 35 U.S.C. 154(b) by 212 days.

(21) Appl. No.: 10/246,268

(22) Filed: Sep. 18, 2002

(65) Prior Publication Data

US 2003/0074101 A1 Apr. 17, 2003

(51) Int. Cl.[7] ........................ G08B 21/00; B22D 46/00; G01B 5/28; G01N 19/02

(52) U.S. Cl. .......................... 340/675; 164/4.1; 73/104; 200/61.13

(58) Field of Search .......................... 164/4.1, 451–455; 340/675, 677, 678; 73/104, 105, 159, 865.8; 200/61.13, 61.41, 61.42

(56) References Cited

U.S. PATENT DOCUMENTS 2,636,951 A * 4/1953 Fahringer ................ 200/61.13
3,502,827 A * 3/1970 Beebe ...................... 200/61.13
4,523,624 A * 6/1985 Dantzig et al. ............. 164/454
4,538,669 A * 9/1985 Markarian et al. .......... 164/451
5,451,872 A * 9/1995 Antonine et al. ........... 324/262
6,412,340 B1 * 7/2002 Nguyen et al. ............... 73/104
6,568,252 B1 * 5/2003 Boutaghou .................... 73/104
2002/0040594 A1 * 4/2002 Matsui et al. ................. 73/104

* cited by examiner

*Primary Examiner*—Jeffery Hofsass
*Assistant Examiner*—Anne V. Lai
(74) *Attorney, Agent, or Firm*—Fulbright & Jaworski LLP

(57) ABSTRACT

An alarm system for a casting mold is provided, which includes an alarm electrically connected to the casting mold; and at least one sensing unit electrically connected to the alarm, and spaced apart by a predetermined gap from a cast to be drawn from the casting mold. During a drawing process, if the cast is formed with failure in appearance such as deformation, burr edges or uneven thickness, the cast drawn out of the casting mold would come into contact with the sensing unit and thereby induce the alarm to generate an alarm signal to notify an operator who may immediately solve any operational problems.

6 Claims, 5 Drawing Sheets

ALARM SYSTEM FOR CASTING MOLD

FIELD OF THE INVENTION

The present invention relates to alarm systems for casting molds, and more particularly, to an alarm system with at least one sensing unit mounted to a casting mold for casting coins.

BACKGROUND OF THE INVENTION

A conventional casting mold for metal casting is substantially composed of four parts, including a mold locking mechanism, a casting mechanism for melted alloy, a drawing mechanism for forming a cast, and a control system. For fabricating a cast by the casting mold, the first step is to quickly assemble the mold; then, the mold is slowly locked. Melted alloy is injected into the mold; after it is cooled and cured, a drawing process is performed. As shown in FIG. 5, during the drawing process to cast coins, a cast 3 formed from a mold cavity (not shown) of a graphite module 7 is clamped cooperatively by a press member 5 and a clamp base 6 of the drawing mechanism (not designated by a reference numeral), to be drawn leftwards out of the graphite module 7. Thereafter, the fabricated cast 3 is readily subject to subsequent processes.

However, during cast fabrication, problems such as inaccurate locking of the casting mold or improper temperature control, if being encountered, may undesirably cause deformation, displacement, burr edges or uneven thickness for the fabricated cast 3, or may lead to cracks of the graphite module 7. As the cast fabrication processes are automatically implemented, with the conventional casting mold not having a detecting mechanism for detecting failure of the cast 3, after completing the drawing process, the cast 3 would directly undergo subsequent processes even in the case of the cast 3 being defective with the above drawbacks or cracking of the graphite module 7. As a result, if failure of the cast 3 or cracking of the graphite module 7 cannot be immediately resolved, a casting oven (not shown) may thus be damaged and cause leakage, thereby leading to material wastes, increased costs for repairing the casting oven and time wastes for fabrication interruption.

SUMMARY OF THE INVENTION

A primary objective of the present invention is to provide an alarm system for a casting mold, which can detect a cast being improperly formed at an early stage of a drawing process; when failure of the cast is detected, an operator may immediately adjust or stop the drawing process to restore proper drawing conditions, thereby preventing further damage to the casting mold and reducing overall fabrication costs.

In accordance with the above and other objectives, the present invention proposes an alarm system for a casting mold, comprising: an alarm electrically connected to the casting mold; and at least one sensing unit electrically connected to the alarm, and spaced apart by a predetermined gap from a cast to be drawn from the casting mold. During a drawing process, if the cast is formed with failure in appearance such as deformation, burr edges or uneven thickness, the cast drawn out of the casting mold would come into contact with the sensing unit and thereby induce the alarm to generate an alarm signal to notify an operator who may immediately solve any operational problems.

Moreover, a drawing channel from which the cast is drawn out of the casting mold, may be internally formed with a graphite frame and a graphite plate; during the drawing process, if the graphite frame and/or the graphite plate are cracked by the defective cast with failure, a broken piece of graphite would be attached to and moved with the cast, to thereby touch the sensing unit and induce the alarm to generate the alarm signal.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
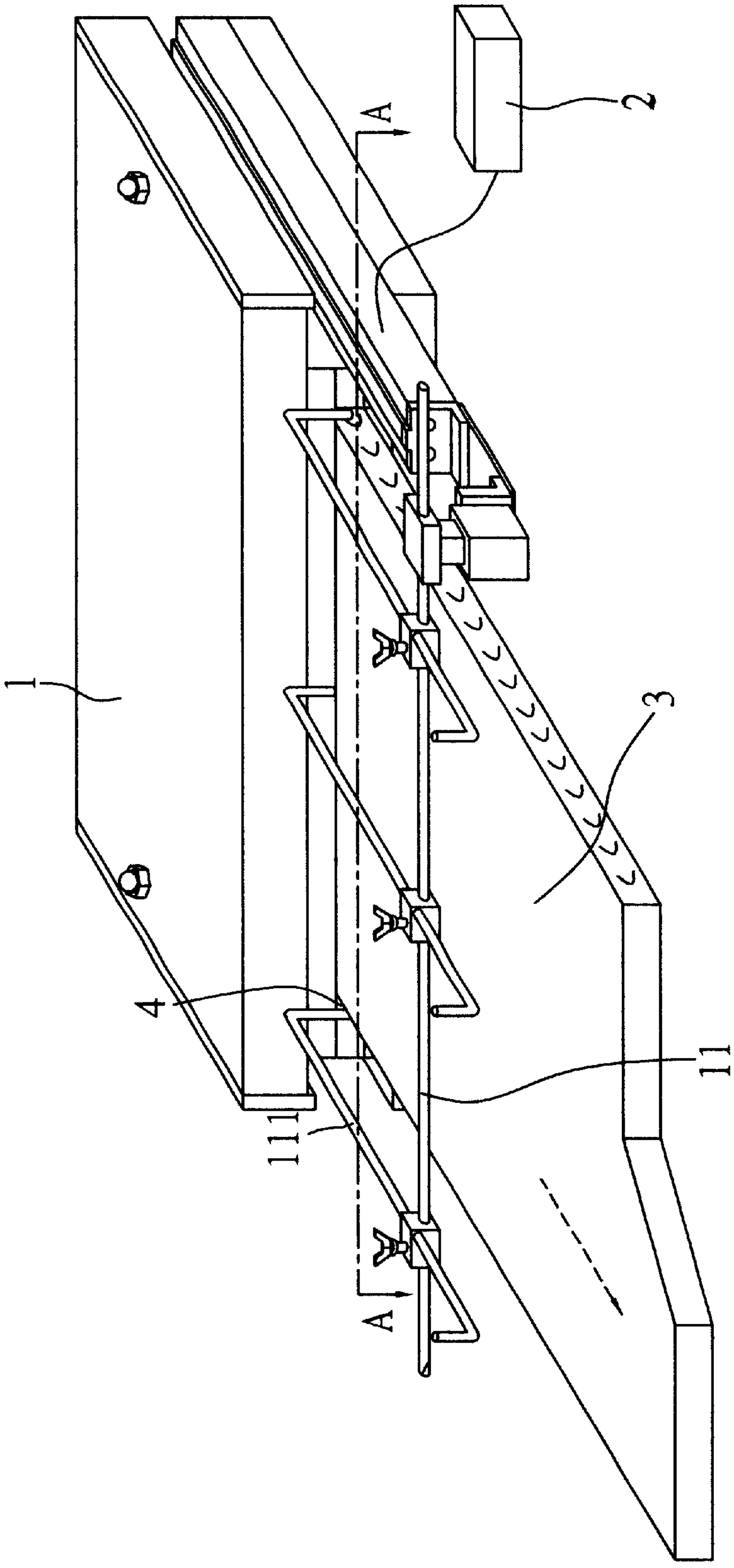
FIG. 1 is a perspective view of a casting mold with an alarm system according to the invention.

Preferred embodiments of an alarm system for a casting mold proposed in the present invention are described in detail as follows with reference to FIGS. 1 to 4, wherein elements that are identical to those in the above prior art are designated with the same reference numerals as the prior art for easy interpretation and explanation.

Figure 2:
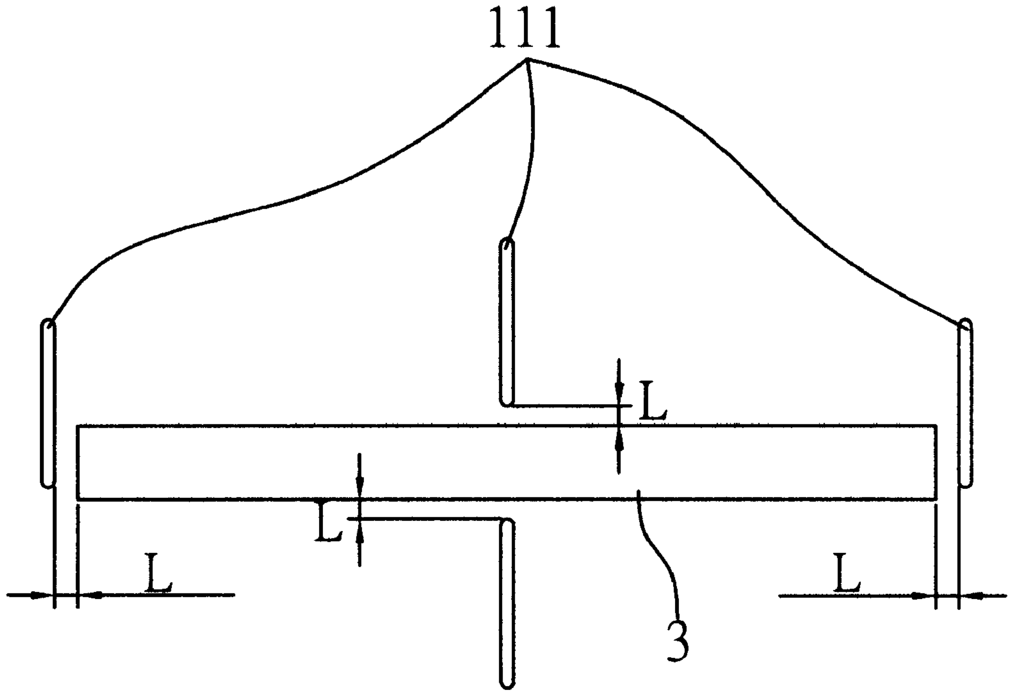
FIG. 2 is a cross-sectional view of FIG. 1 taken along line A—A.

As shown in FIGS. 1 and 2, the alarm system according to the invention is constructed by connecting an alarm 2 to a casting mold body 1, wherein the casting mold body 1 is formed with a supporting mechanism 11 laterally extending above or below with respect to an exit of a drawing channel 4 from which a cast 3 is drawn out of the casting mold body 1. One or more sensing units 111 are mounted to the supporting mechanism 11, and each sensing unit 111 is shaped with one end thereof being downwardly bent and the other end being upwardly bent, such that if one end is worn out after long-term usage, it can be replaced by the other end. During a drawing process to draw the cast 3 from the casting mold body 1, the sensing units 111 are spaced apart from sides of the cast 3 by a gap L. If the cast 3 is undesirably adapted to have deformation, burr edges or uneven thickness, it would come into contact with the sensing units 111 and induce the alarm 2 to generate an audio or visual alarm signal such as a sound or flash to notify an operator who may properly solve any operational problems.

Figure 3:
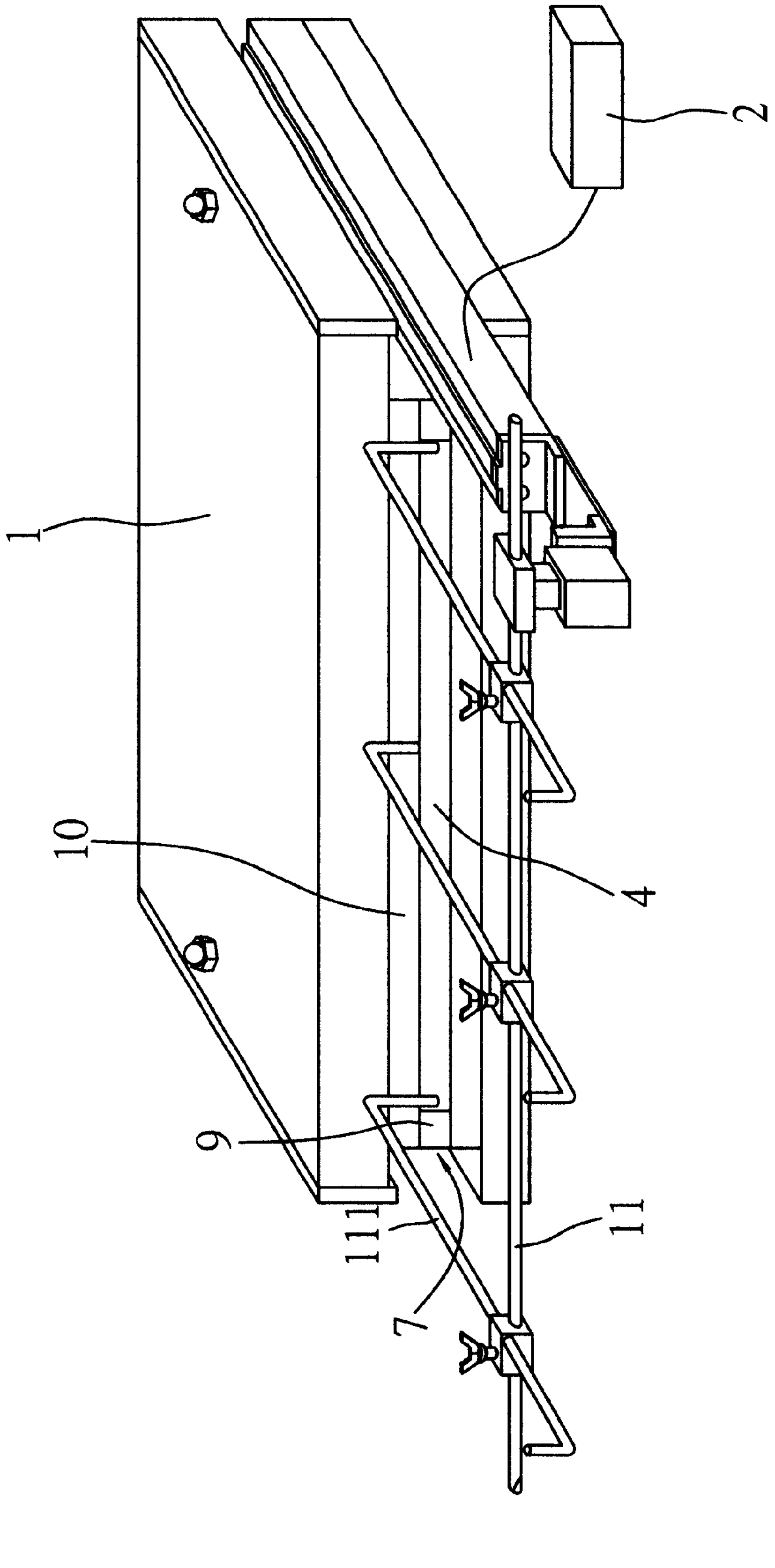
FIG. 3 is another perspective view of the casting mold with the alarm system according to the invention.
Figure 4:
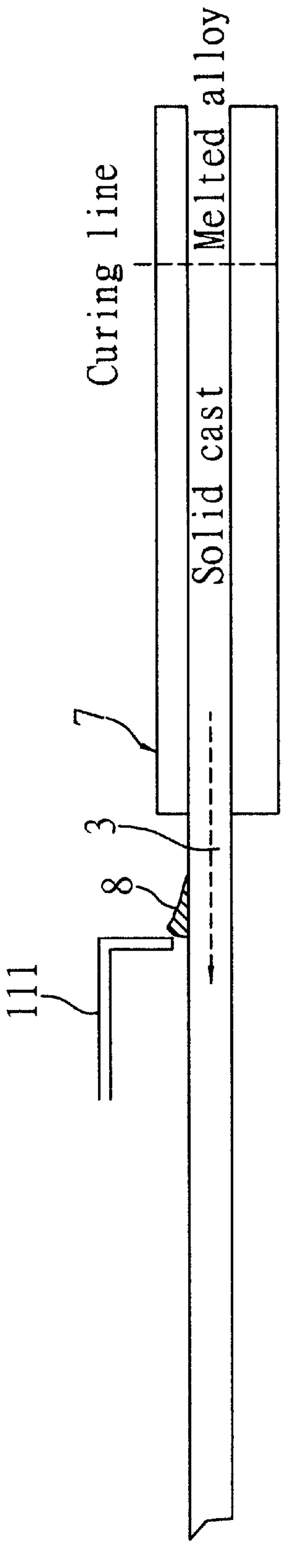
FIG. 4 is a schematic diagram showing a drawing process in the use of the casting mold with the alarm system according to the invention.
Figure 5:
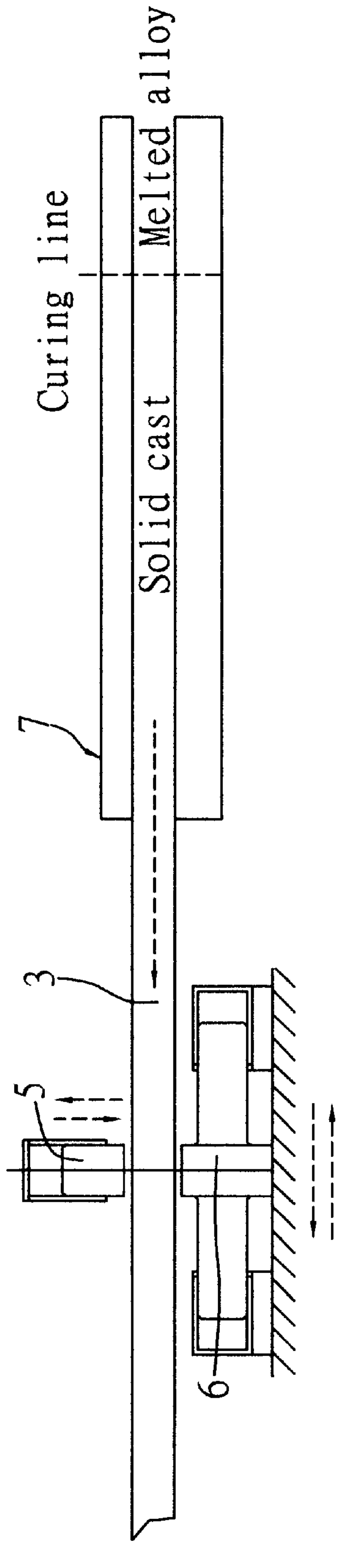
FIG. 5 (PRIOR ART)
FIG. 5 (PRIOR ART) is a schematic diagram showing a drawing process in the use of a conventional casting mold.

As shown in FIG. 3, the cast drawing channel 4 of the casting mold body 1 is internally formed with a graphite module 7, which is composed of a graphite frame 9 and a graphite plate 10. During the drawing process to draw the cast 3 from the casting mold body 1, as shown in FIG. 4, if the cast 3 is defective with deformation, burr edges or uneven thickness, it may abut and press against the graphite frame 9 and the graphite plate 10, leading to cracks of the graphite module 7 in a manner that, a broken piece of graphite 8 would be attached to and moved with the cast 3 out of the casting mold body 1, to thereby come into contact with the sensing units 111 and induce the alarm 2 to generate the alarm signal.

Therefore, by using the above alarm system for a casting mold according to the invention, during cast fabrication, failure of a cast can be detected at an early stage in a drawing process, and notifies an operator by means of an audio or visual alarm signal generated from the alarm system. Once the operator is informed of failure of the cast, he may immediately stop the drawing process to prevent further production of inferior casts, and properly modulate operational control conditions for the drawing process, so as to improve quality and yield of fabricated casts and to reduce cost and material wastes.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An alarm system for a casting mold, comprising:

an alarm electrically connected to the casting mold; and at least one sensing unit electrically connected to the alarm, and spaced apart by a predetermined gap from a cast to be drawn from the casting mold, wherein if the cast is adapted to be formed with failure in appearance, the cast drawn out of the casting mold comes into contact with the sensing unit to thereby induce the alarm to generate an alarm signal.

2. The alarm system of claim 1, wherein the casting mold is formed with a supporting mechanism located near a drawing channel from which the cast is drawn out of the casting mold, allowing the sensing unit to be disposed on the supporting mechanism.

3. The alarm system of claim 2, wherein the drawing channel of the casting mold is internally formed with a graphite frame and a graphite plate.

4. The alarm system of claim 1, wherein at least one end of the sensing unit is adapted to be spaced apart from a side of the cast by the predetermined gap.

5. The alarm system of claim 1, wherein the alarm signal is an audio signal.

6. The alarm system of claim 1, wherein the alarm signal is a visual signal.

* * * * *